United States Patent
Bivens et al.

(10) Patent No.: US 10,242,103 B2
(45) Date of Patent: *Mar. 26, 2019

(54) DYNAMIC FACETED SEARCH

(71) Applicant: International Business Machines Corporation, Armonk, NY (US)

(72) Inventors: John A. Bivens, Ossining, NY (US); Yu Deng, Yorktown Heights, NY (US); Kaoutar El Maghraoui, Yorktown Heights, NY (US); Ruchi Mahindru, Elmsford, NY (US); HariGovind V. Ramasamy, Cambridge, MA (US); Soumitra Sarkar, Cary, NC (US); Long Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,777

(22) Filed: Feb. 19, 2018

(65) Prior Publication Data
US 2018/0232450 A1 Aug. 16, 2018

Related U.S. Application Data

(63) Continuation of application No. 15/433,041, filed on Feb. 15, 2017.

(51) Int. Cl.
*G06F 17/30* (2006.01)
*G06F 3/0482* (2013.01)

(52) U.S. Cl.
CPC ...... *G06F 17/30864* (2013.01); *G06F 3/0482* (2013.01); *G06F 17/30011* (2013.01);
(Continued)

(58) Field of Classification Search
CPC .... G06F 17/2745; G06F 3/0482; G06F 3/048; G06F 17/3053; G06F 17/30528;
(Continued)

(56) References Cited

U.S. PATENT DOCUMENTS 7,890,499 B1 * 2/2011 Boswell ............ G06F 17/30864
707/722
9,336,314 B2 5/2016 Lam
(Continued)

OTHER PUBLICATIONS

Bast et al., "When You're Lost for Words: Faceted Search With Autocompletion", SIGIR '06 Workshop on Faceted Search, Aug. 10, 2006, Seattle, Washington, USA, Copyright 2006 ACM 1-59593-369-7/06/0008. 5 pages.
(Continued)

*Primary Examiner* — Augustine K. Obisesan
(74) *Attorney, Agent, or Firm* — David B. Woycechowsky

(57) ABSTRACT

Embodiments of the present invention provide systems and methods for the discovery of facets. A search query over sets of data (e.g., a set of documents) leads to search results. The search results are organized by facets. Responsive to receiving new queries, facets are dynamically extracted from the search results. Furthermore, user profiles are dynamically updated. The order of presentation of facets, as displayed in a graphical user interface, can be modified based on the extracted facets.

1 Claim, 6 Drawing Sheets

(52) U.S. Cl.
CPC .... *G06F 17/3053* (2013.01); *G06F 17/30554* (2013.01); *G06F 17/30598* (2013.01)

(58) Field of Classification Search
CPC ............. G06F 17/30867; G06F 3/0481; G06F 17/2785; G06F 21/316; G06F 2221/2133; G06F 17/30; G06F 17/30321; G06F 17/30386; G06F 17/30539
See application file for complete search history.

(56) References Cited

U.S. PATENT DOCUMENTS

| | | | |
|---|---|---|---|
| 9,348,892 B2 | 5/2016 | Jain et al. | |
| 9,354,790 B2 | 5/2016 | Scherpa et al. | |
| 9,720,944 B2 | 8/2017 | Lightner et al. | |
| 2006/0294071 A1* | 12/2006 | Weare | G06F 17/30864 |
| 2007/0156677 A1* | 7/2007 | Szabo | G06F 17/30522 |
| 2008/0243778 A1 | 10/2008 | Behnen | |
| 2011/0125764 A1 | 5/2011 | Carmel | |
| 2012/0011129 A1* | 1/2012 | van Zwol | G06F 17/30864 707/748 |
| 2012/0030152 A1* | 2/2012 | Pueyo | G06F 17/30867 706/12 |
| 2012/0226681 A1* | 9/2012 | Paparizos | G06F 17/3053 707/723 |
| 2013/0159325 A1* | 6/2013 | Polonsky | G06F 17/30424 707/754 |
| 2013/0166547 A1* | 6/2013 | Pasumarthi | G06Q 10/06 707/728 |
| 2013/0226916 A1* | 8/2013 | Dredze | G06F 17/3053 707/727 |
| 2014/0258277 A1* | 9/2014 | Cheng | G06F 17/30424 707/723 |
| 2016/0026643 A1* | 1/2016 | Desai | G06F 17/3053 707/727 |

OTHER PUBLICATIONS

Dachselt et al., "FacetZoom: A Continuous Multi-Scale Widget for Navigating Hierarchical Metadata", CHI 2008 Proceedings—Multidimensional Visualization, CHI 2008, Apr. 5-10, 2008, Florence, Italy, Copyright 2008 ACM 978-1-60558-011-1/08/04, pp. 1353-1356.

Dakka et al., "Automatic Construction of Multifaceted Browsing Interfaces", CIKM '05, Oct. 31-Nov. 5, 2005, Bremen, Germany, Copyright 2005 ACM 1-59593-140-6/05/0010, pp. 768-775.

Dakka et al., "Automatic Discovery of Useful Facet Terms", SIGIR '06 Seattle, Washington, USA, Copyright 2006 ACM 0-12345-67-8/90/01, 5 pages.

Dakka et al. ,"Automatic Extraction of Useful Facet Hierarchies from Text Databases", ICDE '08 Proceedings of the 2008 IEEE 24th International Conference on Data Engineering, IEEE Computer Society Washington, DC, USA, pp. 466-475.

Dash et al., "Dynamic Faceted Search for Discovery-driven Analysis", CIKM'08, Oct. 26-30, 2008, Napa Valley, California, USA, Copyright 2008 ACM 978-1-59593-991-3/08/10, pp. 3-12.

Hearst, Marti A., "UIs for Faceted Navigation Recent Advances and Remaining Open Problems", HCIR2008, 5 pages.

Karlson et al., "FaThumb: A Facet-based Interface for Mobile Search", CHI 2006 Proceedings—Search & Navigation: Mobiles & Audio, Apr. 22-27, 2006—Montreal, Quebec, Canada, Copyright 2006 ACM 1-59593-178-3/06/0004. pp. 711-720.

Roy et al., "Minimum-Effort Driven Dynamic Faceted Search in Structured Databases", CIKM'08, Oct. 26-30, 2008, Napa Valley, California, USA, Copyright 2008 ACM 978-1-59593-991-3/08/10, pp. 13-22.

Sanderson et al., "Deriving concept hierarchies from text", SIGIR '99, Proceedings of the 22nd annual international ACM SIGIR conference on Research and development in information retrieval, Berkley, CA, USA, Copyright 1999 ACM 1-58113-096-1/99/0007, pp. 206-213.

Smith, et al., "FacetMap: A Scalable Search and Browse Visualization", IEEE Transactions on Visualization and Computer Graphics, vol. 12, No. 5, Sep./Oct. 2006, Manuscript received Mar. 31, 2006; accepted Aug. 1, 2006; posted online Nov. 6, 2006, 1077-2626/06 © 2006 IEEE, Published by the IEEE Computer Society, pp. 797-804.

Bivens et al., "Dynamic Faceted Search" U.S. Appl. No. 15/433,041, filed Feb. 15, 2017, 31 pages.

Appendix P—List of IBM Patents or Patent Applications Treated as Related, Filed herewith, 2 Pages.

* cited by examiner

DYNAMIC FACETED SEARCH

BACKGROUND

The present invention relates generally to the field of data management, and more particularly to searching and querying data.

Generally, a faceted search (which is also referred to as faceted navigation or faceted browsing) refers to a technique for accessing a collection of information represented using a faceted classification system. This allows an end-user to explore the collected information by applying multiple filters. The facets are multiple explicit dimensions corresponding to properties of the information elements. The faceted classification system classifies each information element along facets and thus, enables the classifications to be accessed and ordered in multiple ways rather than in a single, pre-determined taxonomic order. These facets are derived from an analysis of the text of an item using entity extraction techniques or from pre-existing fields in a database such as the "author," the "descriptor," the "language," and the "format." In some instances, existing web-pages, product descriptions, or online collections of articles can be augmented when paired with or otherwise made available with navigational facets.

SUMMARY

According to one embodiment of the present invention, a method for automatic and dynamic faceted discovery is provided. The method comprises: automatically extracting, by one or more processors, a plurality of facets from a set of search results; analyzing, by one or more processors, the plurality of facets utilizing two modes, wherein the first mode is an offline processing and wherein the second mode is a steady state processing; creating, by one or more processors, a faceted hierarchy based, at least in part, on the analyzed plurality of facets; and modifying, by one or more processors, the faceted hierarchy based, on dynamically discovered facets.

Another embodiment of the present invention provides a computer program product for automatic and dynamic faceted discovery, based on the method described above.

Another embodiment of the present invention provides a computer system for automatic and dynamic faceted discovery, based on the method described above.

DETAILED DESCRIPTION

Faceted search is a search technique that is widely used by e-commerce websites in order to help the users query their data and find relevant results. Existing faceted search systems are designed with a predefined or static set of categories or facets (e.g., multiple explicit dimensions corresponding to properties of the information elements). The number and nature of attributes of some corpus of data are not necessarily unique and may change as the data evolves. Furthermore, different end-users might need to navigate the data from various perspectives. The order of important and relevant facets might be different from one user to another depending on various aspects. For example, in the technical support domain, an end-user might prefer to choose first a platform, then machine type, and finally a model. Some other end-user might prefer to start first with an error description first, then a machine type, etc. Different end-users will have different preferences to navigate the data and to select the data attributes depending on various conditions (domain they are searching in, problem they are trying to solve, etc.). As such, embodiments of the present invention provide solutions for providing customized searching that increases relevance to a user and improves faceted searches by: (i) dynamic extraction of search facets; (ii) automatic construction of the order of the presentation of the facets to the end-user based on a set of documents, user queries, and user profiles; and (iii) dynamic building and extension of the user profile as a given end-user uses the system continuously.

Figure 1:
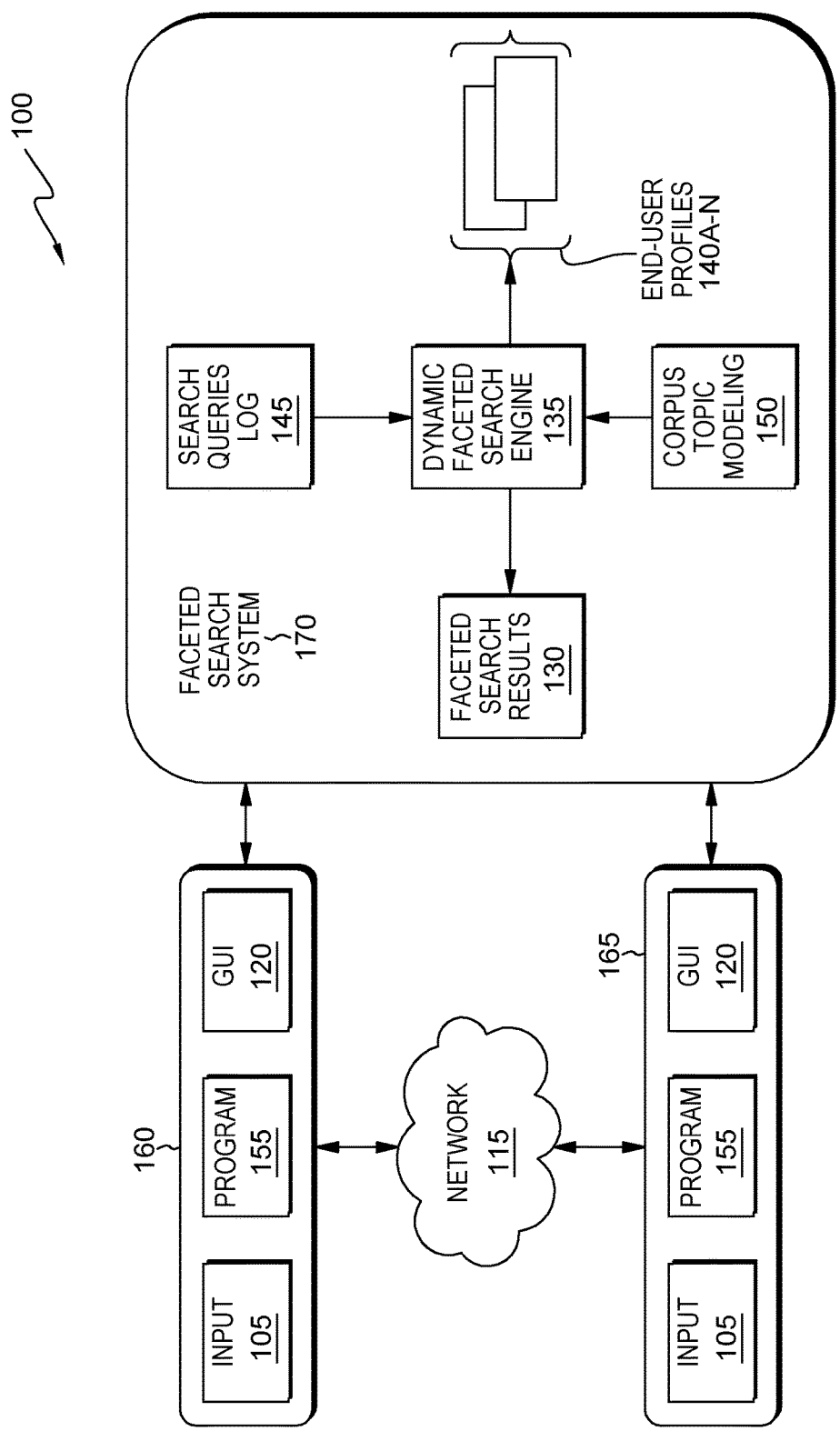
FIG. 1 is a functional block diagram illustrating a data processing environment, in accordance with an embodiment of the present invention.

The present invention will now be described in detail by referencing the Figures. FIG. 1 is a functional block diagram illustrating a data processing environment, generally designated 100, in accordance with one embodiment of the present invention. FIG. 1 provides only an illustration of implementation and does not imply any limitations regarding the environments in which different embodiments may be implemented. Modifications to data processing environment 100 may be made by those skilled in the art without departing from the scope of the invention as recited by the claims. In this exemplary embodiment, data processing environment 100 includes computing devices 160 and 165; components of faceted search system 170—faceted search results 130 and dynamic faceted search engine 135; search queries log 145; corpus topic modeling 150; and end-user profiles 140A-N, which are all connected via network 115.

End-user computing device 160 and end-user computing device 165 can be desktop computers, laptop computers, specialized computer servers, or any other computer systems known in the art. In certain embodiments, end-user computing device 160 and end-user computing device 165 represent computer systems utilizing clustered computers and components to act as a single pool of seamless resources when accessed through network 115. For example, such embodiments may be used in data center, cloud computing, storage area network (SAN), and network attached storage (NAS) applications. In certain embodiments, end-user computing device 160 and end-user computing device 165 represent virtual machines. In general, end-user computing device 160 and end-user computing device 165 are representative of any electronic devices, or combination of electronic devices, capable of executing machine-readable program instructions, as described in greater detail with regard to FIG. 6.

End-user computing device 160 and end-user computing device 165 each include user input 105, program 155, and GUI 120. Input 105 may be data (e.g., information/contents contained within one or more queries) to be processed by the faceted search systems, wherein the data is amenable for processing by program 155 (which is described in more detail below) and sent to GUI 120 via network 115. Input 105 is typically text data to be processed by faceted search system 170. GUI 120 may be for example, a graphical user interface (GUI) or a web user interface (WUI) and can display text, documents, web browser windows, user options, application interfaces, instructions for operation, and includes the information (such as graphics, text, and sound) a program presents to a user and the control sequences the user employs to control the program. GUI 120 is capable of receiving data, user commands, and data input modifications from a user and communicating with program 155. The end-users of computing devices 160 and 165 can view the contents deriving from the components of the faceted search systems on GUI 120.

Different end-users may have different preferences to navigate the data and to select the data attributes depending on various conditions (e.g., domain being searched, problem being solved, etc.). In data processing environment 100, one end-user is associated with end-user computing device 160 and another end-user is associated with end-user computing device 165.

Program 155 is embedded into software program or software application, which enables methods and systems which: (i) dynamically extract search facets; (ii) automatically construct the order of the presentation of the facets to the end-user based on a set of documents, user queries, and end-user profiles (i.e., profiles of users that specify preferences); and (iii) dynamically build and extend the user profile as a given end-user uses the system continuously. These automated methods and systems dynamically extract and rate search facets by performing the functionalities of: (i) utilizing topic modeling to discover facets in the corpus (e.g., corpus topic modeling 150); (ii) creating a faceted profile (e.g., end-user profiles 140A-A) for each end-user, based on a click-log (of search results which have been or may be explored further); (iii) re-organizing/re-ordering search results such that the end-user may view and focus on the faceted of interest in the preferred order as desired by the end-user in a graphical user interface; and (iv) use cross-user profile analysis (i.e., an analysis of multiple end-user profiles) and/or adopt faceted profiles (e.g., preferences) of other end-users who have greater experience within a closed domain (e.g., Technical Support Services, hereafter referred to as TSS), wherein the closed domain has access to special information about the end-users (e.g., expertise, efficiency, successful resolution in the first attempt, time taken to close "tickets" in a customer care situation, etc.). With respect to cross-user profile analysis, the analysis of multiple end-user profiles of faceted preferences can provide advice to system end-users on more efficient ways to use search results (i.e., an advisor functionality). These functionalities are used to perform analysis, which may be done across end-users for all queries submitted over a given time. Alternatively, the analysis may be done across all of the end-users and different groups of queries which are similar to each other. The discovery of facets in the corpus, faceted profiles, reorganization/reordering results, and cross profile analysis are search enhancement features described in further detail below.

Program 155 allows for the automatic extraction of facets and the personalization of the facets presented to the end-user based on historical profiles of the end-user and the profiles of similar end-users in the past. This in turn leads to the advantages of at least one of the following: (i) the utilization of topic modeling to dynamically discover facets in a corpus; (ii) the creation of a faceted hierarchy based on the dynamically discovered facets in the corpus; (iii) the creation of a per end-user faceted profile based on: (a) a click-log of search results and (b) the dynamically created faceted profile; (iv) the reordering and reorganization of search results in order to allow an end-user to focus on the facet of interest in a preferred order; (v) the utilization of cross-user-profile analysis to provide an advisor functionality in a closed domain containing access information about the end-user (e.g., expertise, efficiency in finishing tasks, etc.); (vi) the analysis of multiple end-user profiles of faceted preferences in order to advise the end-users on more efficient ways to examine/apply the search results; and (vii) the adoption of faceted profiles (i.e., preferences) of other end-users who have greater expertise in a domain.

An automated system and method, as enabled by program 155, dynamically extracts search facets, wherein the extraction processes of dynamic search facets are guided by the sub-domain relevant to the end-user's role (i.e., profile of the end-user). Furthermore, program 155 automatically constructs the order of presenting the facets to the end-user based on a specific set of documents, end-user queries, and end-user profiles; and creates an end-user profile (e.g., end-user profiles 140A-N). The set of specific documents, end-user queries, and end-user profiles 140A-N are used to derive "digestible media", wherein the derived "digestible media" is created data content that can be modified. The leveraging of program 155 facilitates the dynamic extension of end-user profile 140A-N by the system as a given end-user uses the system continuously. In a closed domain, specific parts of the documents, deemed to be not relevant for a specific end-user population (e.g., based on job role), are scrapped. For example, sections pertaining to the end-user's guide of the document would be relevant for the end-user of the product, whereas the troubleshooting section would be relevant for an administrator. Techniques such as topic modeling (e.g., corpus topic modeling 150) and other faceted extraction methods, deriving from faceted search results 130 and dynamic faceted search engine 135, are used on the appropriate corpus based on the role of the end-user. Subsequently, different facets are exposed, based on the end-user's role.

Furthermore, program 155 enables role-based selective faceted discovery on different corpuses with different parts. Roles are capabilities associated with a function or handling of a software program. Software administration is a role where a person is responsible for the upkeep, configuration, and reliable operation of computer systems. Other roles include software tester (i.e., an investigation conducted to provide potential end-users of the software program with information about the software program); and software developer (i.e., the research, design, and programming of the software program). Program 155 extends the faceted discovery on closed domains (i.e., scope) by not examining the entire document of the corpus. Instead, selective sections of the documents in the corpus are examined. More specifically, program 155 identifies the parts (e.g., chapters) of the document or the types of documents that are relevant for different types of end-user populations/preferences, based on topic modeling or other techniques to discover facets. Depending on the end-user's role/profile, program 155 provides the end-user with scope/role-specific facets. For example, the same end-user logged in as administrator would see different facets as opposed to when logged in as a tester or a developer. Information which is examined in the selective sections of the documents in the corpus includes: (a) the end-user's role (e.g. system administrator) and/or profile (administration related chapters would be more relevant) versus (b) Level 1 Agent (e.g., trouble shooting based chapters would be more relevant) versus (c) Tester. (A Level 1 Agent is the first line of support which typically receives inbound requests from a customer via different channels, such as phone, websites, chatrooms, email, etc. The Level 1 Agent typically have limited technical expertise ranging from 0 to 4 years. The Tester is an individual with a job/functional role, where the individual is responsible for testing designed and implemented capabilities.)

Furthermore, an automated method to dynamically extract and rate search facets, as enabled by program 155, incorporates the option of "determining/indicating trustworthiness" in faceted discovery and selection. In a closed domain (e.g., TSS), where there is special information about the end-users (e.g., expertise), program 155 performs cross-user-profile analysis to provide an advisor functionality. By analysis of multiple user profiles of faceted preferences, advice is sent to system end-users on more efficient ways in which to use search results. Furthermore, the advice may be to adopt faceted profiles (i.e., preferences) of other end-users who have greater expertise in a domain. For example, a query on stock trading is received from end-user A, who has little experience in the domain of stock trading. End-user B has experience in stock trading and frequently posts comments in stock trading message boards while end-user C is a licensed broker who has an established reputation as a successful day trader and thorough stock picker. Thus, program 155 sends the advice of adopting the faceted profile of end-user C. This type of analysis is more thorough than suggestions found on e-commerce websites, which indicate other products a consumer bought on the e-commerce website. Also, the analysis can be performed across: (i) all end-users for all queries submitted over a given period of time; or (ii) all end-users and different groups of similar queries, which are similar to each other.

Network 115 may be, for example, a local area network (LAN), a wide area network (WAN) such as the Internet, or a combination of the two, and may include wired, wireless, or fiber optic connections. In general, network 115 can be any combination of connections and protocols that will support communication between: (i) computing devices 160 and 165; and (ii) the components of faceted search systems—faceted search results 130 and dynamic faceted search engine 135; search queries log 145; corpus topic modeling 150; and end-user profiles 140A-N.

Faceted search results 130 is information, which may be accessed and is organized according to a faceted classification system. This allows end-users to explore a collection of information by applying multiple filters. The faceted classification system classifies each information element along facets, which can be ordered in multiple explicit dimensions, as opposed to a single, pre-determined, taxonomic order. Named-entity recognition (NER), as performed on faceted search results 130, is a subtask of information extraction (i.e., automatic extraction of structured information from information not having a pre-defined model or not organized in a pre-defined manner) which seeks to locate and classify named entities in text into pre-defined categories (e.g., names of persons, organizations, locations, expression of times, quantities, monetary values, percentages, etc.). Direct search allows end-users to write in queries as one or more words in a text box.

Dynamic faceted search engine 135 is implemented within a technique to process a combination of both structured and unstructured data. For example, patent documents contain structured data contents (e.g., inventors, assignees, class codes, and filing date), and unstructured data contents. Dynamic faceted search engine 135 considers single-dimensional facets (i.e., a single set of information elements) and faceted combinations (i.e., two or more sets of information elements). In one embodiment, dynamic faceted search engine 135 uses a runtime engine built on top of an inverted index and dynamically computes aggregations over results returned by the index. The index collects, parses, and stores data to enable faster and accurate information retrieval.

Corpus topic modeling 150 is a suite of software that uncovers the hidden thematic structure in document collections (i.e., a corpus). This software helps develop new ways to search, browse, and summarize large archives of text. The structures uncovered by corpus topic modeling 150 may be used to explore an unorganized data deriving from the document collections. The corpus topic comprises a cluster of words that frequently occur together. Corpus topic modeling 150 can connect words with similar meanings and distinguish between uses of words with multiple meanings. Corpus topic modeling 150 is used to dynamically extract and rate search facets. A faceted hierarchy is created which comprises a set of semantically cohesive categories combined as needed to create an expression of a concept. Thus, the faceted classification is not limited to already defined concepts. While this makes the classification quite flexible, it also makes the resulting expression of topics complex. To the extent possible, facets represent "clearly defined, mutually exclusive, and collectively exhaustive aspects, properties or characteristics of a class or specific subject". Some commonly used general-purpose facets are time, place, and form. Systems with faceted classification permit an end-user to examine information along multiple paths corresponding to different orderings of the facets. The hierarchical aspect of faceted hierarchy are developed classes that are subdivided from the most general subjects to the most specific subjects.

Search queries log 145, which derives from a query that an end-user issues to a web search engine, records end-user queries from an index. Search query languages may be governed by strict syntax rules as command languages with keyword or positional parameters. As opposed to search query languages, web search queries are governed by plain text or hypertext with optional search-directives logic (e.g., "and"/"or" statements). In this embodiment, search queries log 145 can derive search queries from either strict syntax rules or plain text, hypertext, and/or other optional search directives logic.

Each unit among end-user profiles 140A-N is associated with an end-user. A single unit among end-user profiles 140A-N is end-user profile 140. User profile 140, in addition to a set of documents and user queries, is used to automatically construct the order of presenting the facets to the end-user. End-user profile 140 contains data associated with a specific end-user which is displayed in a user interface. When end-user profile 140 is built, then end-user profile 140 may be extended dynamically as an end-user uses the system continuously. For example, a system containing documents on baseball includes facets on "regular season standings"; "playoffs"; and "roster of players." By analyzing information across these facets, the end-user can modify the facets in order to best address queries. If the end-user wants to know the starting rotation of the 1986 baseball team prior to playoffs, then the "roster of players" is displayed.

In another example, the contents of end-user profile 140A displayed in the user interface is different from the contents of end-user profile 140B displayed in the user interface. Both end-users associated with end-user profiles 140A and 140B are interested in investments. The end-user associated with end-user profile 140A is interested in only aggressive investments while the end-user associated with end-user profile 140B is interested only in conservative investments.

A system containing documents on investment vehicles include facets on "commodity funds"; "mid-cap stock funds"; "initial public offerings"; and "bond funds." The "commodity funds"; "mid-cap stock funds"; and "initial public offerings" are typically very high risk/high reward investment vehicles and thus deemed as aggressive investments. The "bond funds" are typically low risk/low rewards investment vehicles and thus deemed as conservative investments. Accordingly, only "bond funds" are displayed to the end-user associated with end-user profile 140B. Only "commodity funds"; "mid-cap stock funds"; and "initial public offerings" are displayed for the end-user associated with end-user profile 140A.

Figure 2:
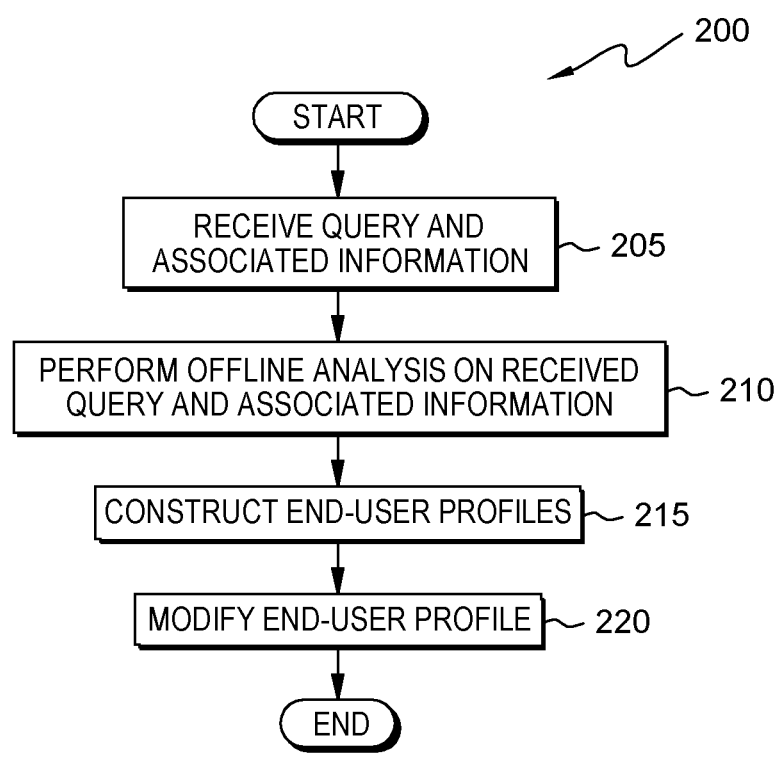
FIG. 2 is a flowchart depicting the operational steps performed by an algorithm processing facets and creating/updating user profiles, in accordance with an embodiment of the present invention.

FIG. 2 is a flowchart 200 depicting the operational steps for processing facets, in accordance with an embodiment of the present invention.

Flowchart 200 are the operational steps performed by program 155.

In step 205, program 155 receives a query and associated information. In this exemplary embodiment, program 155 receives query from GUI 120 in the form of a user query. In other embodiments, program 155 can receive a search query from one or more other components of data processing environment 100 via network 115. A query and associated information as used herein, refers to an executed search including a query and the associated search results of the query. For example, the query may include alphanumerical text such as "stocks" and the associated information for the query can include search results such as price, market cap, and industry.

In step 210, program 155 performs an offline analysis on the received query and associated information. In this exemplary embodiment, program 155 leverages topic modelling topic model of the corpus to perform an offline analysis on the associated information obtained from the query (e.g., the data obtained from step 205). In this embodiment, associated information can include a search log entry. Each search log entry contains: (i) the end-user ID; (ii) the query entered in search engine; (iii) the results obtained from the query; and (iv) the results that the end-user clicked on versus the results that the end-user skipped (e.g., user responses). For each end-user, (i) analysis is performed on: (a) each query issued by an end-user, or (b) collated top topics in the document "facets" or "categories"; (ii) a faceted list is added to end-user profile 140; and (iii) faceted weights in end-user profile 140 are updated. The data contained within the search log entry; issued queries; collated top topics; a faceted list; and the faceted weights are used to construct end-user profile 140. Each result associated with each document is a topic distribution. The most relevant results to answer the query, based on end-user selections and/or preconfigured settings, are ascribed to the "top topics." The top topics in the corpus characterize the facets of the corpus as a faceted hierarchy, as described above.

In step 215, program 155 constructs end-user profiles. In this exemplary embodiment, program 155 constructs end-user profiles 140A-N from the offline analysis performed on the received query and associated information. For example, program 155 can utilize the associated information to delete duplicate preferences and verify current user data to compile an accurate up-to date end user profile for a designated user (e.g., User A). An offline analysis is performed on search logs to build end-user profiles 140A-N. In instances where data associated with a user is not readily available, program 155 can create an end user-profile utilizing available databases.

In step 220, program 155 modifies an end-user profile. In this embodiment, program 155 continually modifies end-user profile 140 upon receiving additional associated information about the specific user. In other embodiments, an end-user may update the end-user profile 140 while being online or offline. Program 155 can then send information to a search engine. The search engine may be dynamic faceted search engine 135, which supports iterative query refinement. The information/data may be faceted search results 130 obtained from the query sent to the dynamic faceted search engine 135. Subsequently, the obtained version of faceted search results 130 are processed by program 155 and used to modify/update the end-user profile 140.

Figure 3:
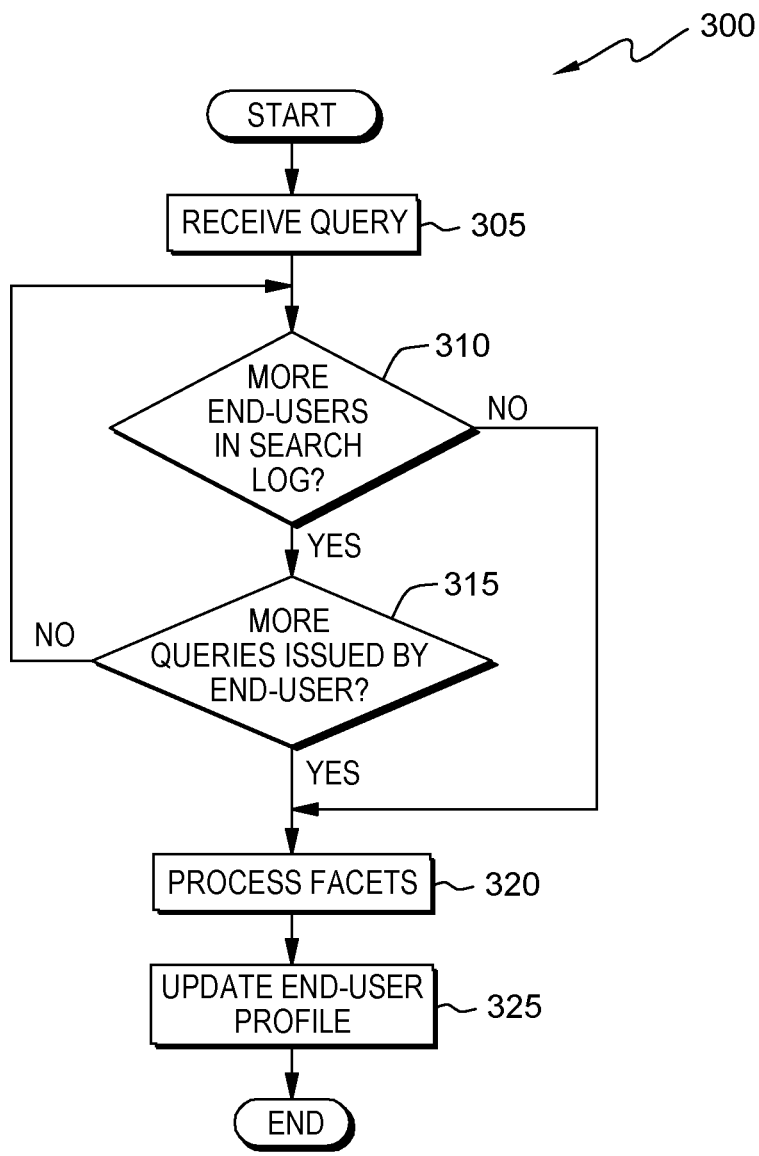
FIG. 3 is a flowchart depicting the operational steps during periodic offline processing, in accordance with an embodiment of the present invention.

FIG. 3 is a flowchart depicting the operational steps during periodic offline processing of search logs, in accordance with an embodiment of the present invention.

In flowchart 300, program 155 enables periodic offline processing of search logs. Instances invoking flowchart 300 already have information/data in the form of an existing end-user profile (e.g., user profile 140) associated with the end-user.

In step 305, program 155 receives a query. Prior to creating a topic model of corpus, an end-user profile may already exist. In instances where the query is received from a user with a created end-user profile, program 155 finds the existing end-user profile residing within the one or more components of data processing environment 100. Furthermore, the received query may be updated based on faceted search results 130 and the search query results that the end-user selected. If program 155 finds an end-user profile did not already exist, then end-user profile 140 is created (during an offline process as previously described with regard to step 210 of FIG. 2) based on faceted search results 130 and the user's interactions with them.

In step 310, program 155 determines if there are more end-users in the search log (e.g., search queries log 145). Upon determining that there are more end-users (with an accompanying end-user profile 140) in addition to the existing end-user, program 155 meets the condition of the "yes" branch. In other words, program 155 moves to step 315 via the "yes" branch. Upon determining that there are no more end-users (with accompanying end-user profiles 140A-N) in addition to the existing end-user, program 155 meets the conditions of the "no" branch. In other words, program 155 moves to step 310 via the "no" branch.

In step 315, program 155 determines if there are more queries issued by an end-user upon determining there are more end-users in the search log. In other words, end-user(s) in addition to the existing end-user are found. The end-user issuing a query may be the existing end-user and/or additional end-user(s). If there is a determination that there are more queries by the existing end-users and/or additional end-user(s) in addition to prior queries, which have issued and are of record in the search log, then program 155 meets the condition of the "yes" branch. In other words, program 155 moves to steps 320 via the "yes" branch. If there is a determination that there are no more queries by the existing end-users and/or additional end-user(s) in addition to prior queries issued and recorded in the search log, then program 155 meets the condition of the "no" branch. In other words, program 155 moves to step 310 via the "no" branch. These determinations may be used to update the query received in step 305, which would be amenable for dynamic processing, as described in step 320.

In step 320, program 155 processes facets upon determining there are more queries issued by the end-user (i.e., the "yes" branch of step 315) or determining there no more end-users in the search log (i.e., the "no" branch of step 310). The processing steps of the facets include: (i) extract "the top topic" (i.e., facets) in documents (e.g., a corpus); (ii) add a faceted list to end-user profile 140; and (iii) update faceted weights in end-user profile 140. Program 155 examines search results obtained from the query issued for search results which have been clicked on by the existing end-user and/or additional end-user(s). The "clicked on" results can be used to analyze or order facets. For example, a search query on "stocks trading at 52-week lows" yields a set of results. The end-user is interested in stocks among the set of results which trade at a price below $1.00. Subsequently, the end-user clicks on these stocks and these "clicked on" results are further organized/categorized into additional facets, such as "exchange traded on"; "sector"; and "average volume". These facets are the extracted facets, which are added into the faceted list to end-user profile 140. Also, the end-user clicks more frequently on documents that show the name of the selected stock and the affiliated "exchange . . . " in comparison to documents that show the name of the selected stock and associated "sector" or "average volume". This is indicative of the end-user being interested in "the exchange traded on" facet. Furthermore, end-user profile 140 is updated to reflect a faceted weighting in favor of "exchange traded on" to "sector" or "average volume".

Accordingly, program 155 analyzes facets of the created topic model of the corpus, wherein the facets are resultant information/data from the topic modelling. Topics associated with a high probability of answering queries are selected as facets for searching structured and unstructured data.

In step 325, program 155 updates (one or more) end-user profiles. An update to the one or more units of end-user profile 140 may be automatic or manual. The automatic updates, which are sent to and incorporated into the one or more units of end-user profile 140, derive from the processing steps in step 320. For example, the manual updates, which are sent and incorporated into the one or more end-user profiles, derive from an end-user entering in information to the one or more units of end-user profile 140.

Figure 4:
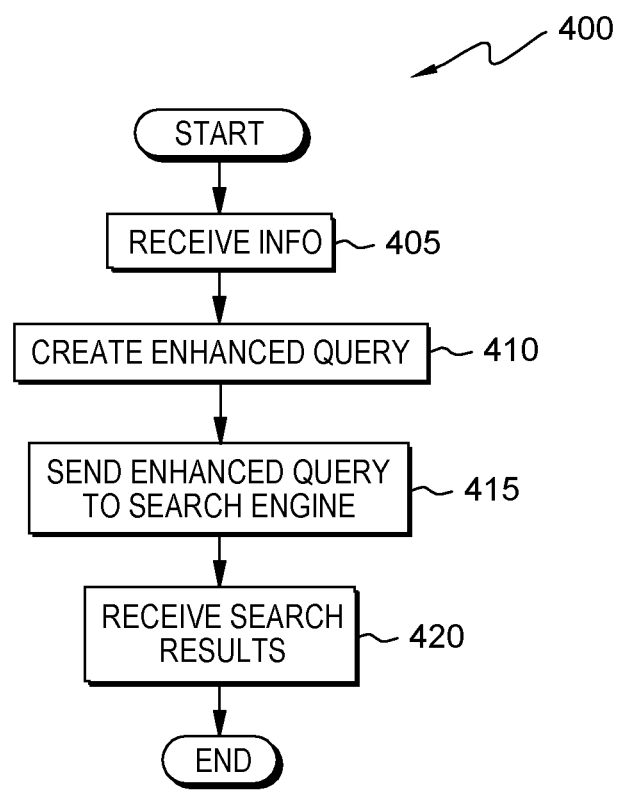
FIG. 4 is a flowchart depicting the operational steps during a steady state search, in accordance with an embodiment of the present invention.

FIG. 4 is a flowchart depicting the operational steps during a steady state search, in accordance with an embodiment of the present invention.

Flowchart 400 depicts the steps involved in sending information to an end-user and making the information viewable to the end-user.

In step 405, program 155 receives info. The received info, at input 105, may be end-user profile info; search index info; and document repository info. Program 155 parses the data found in the searched indexes and the document repository. The end-user profile info, parsed indexes, and document repository are used in part to construct information sent to a search engine (e.g., dynamic faceted search engine 135) using the hierarchy of facets (as described above).

In step 410, program 155 creates an enhanced query. This enhanced query is based on: (i) the received end-user profile info (from step 405); (ii) the received searched index info (from step 405); and (iii) the received document repository (from step 405). The received end-user profile info is used to organize results by preferred facets, as indicated by end-user profile 140. Program 155 extracts information/data from items (i)-(iii) in order to derive terms, which are to be incorporated into the enhanced query. For example, program 155 examines the extracted data/information contained within items (i)-(iii), wherein the data/information in items (i)-(iii) pertains only to stock trading. In this embodiment, program 155 has determined upon using (i)-(iii) that the salient aspect of this data/information (i.e., the extracted facets) is that all of the companies have consistently shelled out dividends over the last ten years. Accordingly, program 155 determines that the terms for the enhanced query is "dividend stocks."

In step 415, program 155 sends the enhanced query to the search engine (via network 115). Accordingly, the search engine processes the query based on the preferred facets. In an exemplary embodiment, the preferred facets are based on preferences/interests as indicated in the end-user profile.

In step 420, program 155 receives the search results. In an exemplary embodiment, the search results are the "answer" to the enhanced query from the search engine, which are sent to input 105 for further processing. These results are organized by preferred facets as indicated in the created end-user profile 140. Further analysis can be done where the preferred facets are modified and thus leading to a different display of search results to the end-user (i.e., output of facets and search results). Top topics/facets may be collated and added to a facet list associated with end-user profile 140. Furthermore, the organization of the results can be modified by applying facet weighting in end-user profile 140. For example, the enhanced query sent (from step 415) to the search engine is for finding "dividend stocks" and the search results are organized into the following facets: "sector"; "dividend yield"; and "exchange." The end-user is interested only in "dividend stocks" which are traded on a particular stock exchange (e.g., Exchange 1), as indicated by that end-user's profile. Program 155 can then further process and organize the data according to a weighted facet such that the "exchange" is the facet used to organize the data. The "exchange" facet will be divvied into various exchanges such as "Exchange 1" (which of interest to the end-user); and "Exchange 2." Program 155 outputs search results to the end-user. The output, as displayed to the end-user, contains the facets processed in step 425.

Figure 5:
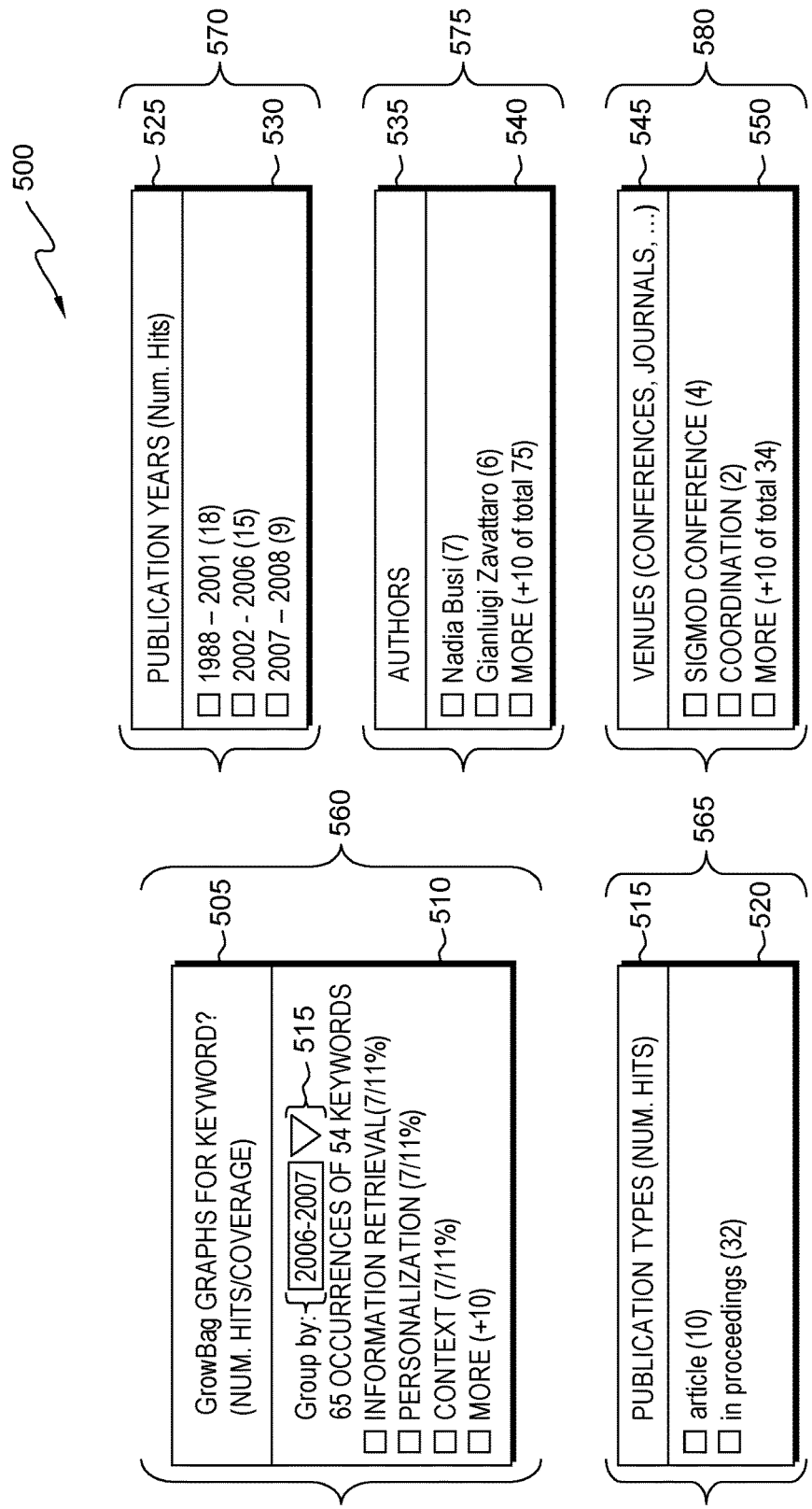
FIG. 5 are examples of facets, in accordance with an embodiment of the present invention.

FIG. 5 are examples of facets, in accordance with an embodiment of the present invention.

In GUI display 500, facets within a Database systems and Logic Programming (DBLP) website are displayed to an end-user. In an exemplary embodiment, a keyword "?" from an issued query has been processed. The results from the processed query are sent to a GUI as a faceted display (e.g., GUI display 500). The faceted display contains topics, publication types, publication years, authors, and venues.

The topics are presented in group 560, wherein title 505 indicates "GrowBag graphs for keyword?" and search results 510 indicates there are "65 occurrences of 54 keywords." The contents of search results 510 may be grouped by year via selecting a yearly time frame within pull-down menu 515. Within the parentheses, the number of hits and percent coverage accompanies the keywords in search results 510. For example, the keyword "information retrieval" is associated with "7" hits and "11" percent coverage; the keyword "personalization" is associated with "7" hits and "11" percent coverage; the keyword "context" is associated with "7" hits and "11" percent coverage; and the keyword "more" is associated with "+10" hits.

The publication types are presented in group 565, wherein title 515 indicates "Publication Types" and search results 520 indicates there are "articles" and "in proceedings." Within the parentheses, the number of hits for "articles" is "10" and the number of hits "in proceedings" is "32."

The publication types are presented in group 570, wherein title 525 indicates "Publication Years" and search results 530 indicates the time periods of the publications from a beginning year to an ending year. The time periods within search results 530 are: "1988-2001"; "2002-2006"; and "2007-2008." Within the parentheses, the number of hits from "1988-2001"; "2002-2006"; and "2007-2008" are "18"; "15"; and "9", respectively.

The authors are presented in group 575, wherein title 535 indicates "Authors" and search results 540 indicates the names of the authors of publications associated with keywords in search results 510. The authors within search results 540 are: "Nadia Busi"; "Gianluigi Zavattaro"; and "more." Within the parentheses, the number of hits for "Nadia Busi"; "Gianluigi Zavattaro"; and "MORE" are "7", "6", and "+10 of total 75", respectively.

The venues are presented in group 580, wherein title 545 indicate "Venues" and search results 550 indicates the conferences and journals associated with keywords in search results 510. The venues within search results 550 are: "SIGMOD CONFERENCE"; "COORDINATION"; and "MORE." Within the parentheses, the number of hits for "SIGMOD CONFERENCE"; "COORDINATION"; and "MORE" are "4"; "2"; and "+10 of total 34", respectively.

Figure 6:
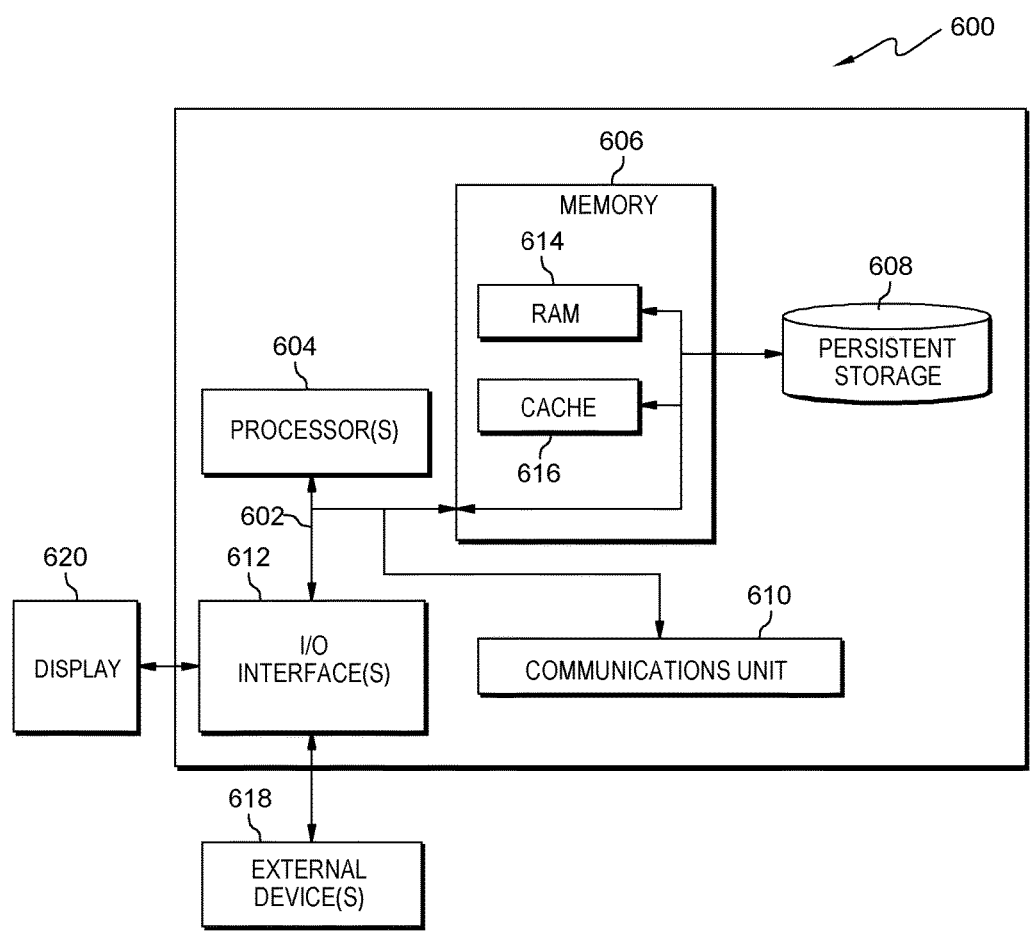
FIG. 6 depicts a block diagram of internal and external components of a computing device, in accordance with an embodiment of the present invention.

FIG. 6 depicts a block diagram of components of a computing device, generally designated 600, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Program instructions and data used to practice embodiments of the present invention may be stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to computing device 600. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A method for automatic and dynamic facet discovery and personalization, comprising:
    automatically extracting, by one or more processors, a plurality of facets from a set of search results in response to receiving a query, wherein automatically extracting the plurality of facets comprises:
        responsive to receiving a query sending instructions to a search engine to search a corpus, wherein the corpus contains structured data and unstructured data,
        accessing a search queries log and a first set of documents associated within the corpus of the search queries log,
        identifying a plurality of facets associated with the first set of documents, wherein each document, of the first set of documents, corresponds to a user, and
        utilizing clustering, topic modeling, and user-feedback techniques to extract an additional number of facets;
    analyzing, by one or more processors, the plurality of facets utilizing two modes, wherein a first mode, of the two utilized modes, is an offline processing mode and wherein a second mode, of the two utilized modes, is a steady state processing mode,
    wherein analyzing, by one or more processors, the plurality of facets utilizing the steady-state processing mode comprises:
        re-ranking, by one or more processors, search results based on the faceted hierarchy, wherein the faceted hierarchy contains the plurality of facets and an order of importance for each facet of the plurality of facets wherein analyzing, by one or more processors, the plurality of facets utilizing the offline processing mode comprises:
  determining, by one or more processors, whether a received search query matches a stored search query and search results associated with the stored search query,
  responsive to determining that the received search query matches the stored search query and the search results associated with the stored search query, enabling, by one or more processors, a user to click on documents associated with the stored search query,
  utilizing, by one or processors, documents that the user has clicked on and historical information associated with the user to identify facets of interest to the user, and
  clustering, by one or more processors, the user into a group with similar profiles, wherein the user is classified as an expert user or a novice user in certain domains, wherein the expert user is associated with queries which are marked as more trustable when extracting the facets;
creating, by one or more processors, a faceted hierarchy based, at least in part, on the analyzed plurality of facets;
modifying, by one or more processors, the faceted hierarchy based on dynamically discovered facets;
providing, by one or more processors, an option to modify the plurality of facets in a display; and
displaying, by one or more processors, the plurality of facets in an order on a user interface based on the option selected by a user.

* * * * *